United States Patent [19]
Zupan

[11] 3,955,605
[45] May 11, 1976

[54] APPARATUS AND METHOD FOR SUPPLYING A METERED CHARGE AT ANY FEED RATE

[75] Inventor: Norbert M. Zupan, Crawfordsville, Ind.

[73] Assignee: H-C Industries, Inc., Crawfordsville, Ind.

[22] Filed: Feb. 27, 1975

[21] Appl. No.: 553,527

[52] U.S. Cl. ............................... 141/1 R; 141/167; 141/187; 141/188; 425/261
[51] Int. Cl.$^2$ ........................................ B65B 3/04
[58] Field of Search ........... 141/167, 183, 187, 188, 141/190, 186, 191, 1, 9, 11; 425/256, 261, 127; 118/317, 319; 74/395

[56] References Cited
UNITED STATES PATENTS
3,825,044   7/1974   Lidikay et al. .................... 141/187

*Primary Examiner*—Houston S. Bell, Jr.
*Attorney, Agent, or Firm*—Dressler, Goldsmith, Clement & Gordon, Ltd.

[57] ABSTRACT

An apparatus and method are disclosed for providing a measured quantity of extrudate material to a plurality of continuously moving uniformly spaced receptacles on a rotating conveyor which can travel at varying speeds. The extrudate material is severed by a cutting means having a driving means which is intermittent in operation and is preferably driven by a stepping motor, thereby enabling the cutting means to have a cutting velocity independent of the feed rate of receptacles and to cleanly sever a slug of extrudate material for each receptacle for any speed at which the conveyor is operating.

12 Claims, 2 Drawing Figures

APPARATUS AND METHOD FOR SUPPLYING A METERED CHARGE AT ANY FEED RATE

BACKGROUND OF THE INVENTION

This invention relates to an improved processing system in which a measured amount of extrudate is severed by a cutting means and deposited in a receptacle traveling on a conveyor. The apparatus of this invention is particularly adapted to crown making machinery, wherein a plurality of uniformly spaced crowns are positioned on a conveyor and a measured amount of molten extrudate is deposited in each crown to be formed into an insert liner.

Heretofore, the quantity of extrudate material deposited in each crown was metered by controlling the rate of extrusion of the extrudate material and then directing this material through a cutting means timed to the feed rate of the crowns past the depositing station. The cutting means was a punch, or was one or more cutting blades. In these prior art systems where the cutting means comprises one or more cutting blades, the speed of the conveyor, the feed rate of the extrudate material, and the frequency of operation and cutting velocity of the cutting means are all proportional at a given rate of production, and the cutting means rotates continuously. Thus, the lower feed rate of the crowns, the lower the cutting velocity of the cutting means. For any rate of production, several variables must be interrelated, and the feed rate of the crowns must therefore be compatible with the cutting rate of the cutting means which must be compatible with the minimum cooling time of the formed liner.

An illustrative prior art apparatus in U.S. Pat. No. 3,827,843 to Blouch, wherein the cutting means has a knife blade which is rotated in synchronism with a conveyor such as a rotating conveyor. The motor which rotates the conveyor also rotates the knife blade on the cutting means via a belt drive and a chain drive which are selected to rotate the knife in timed relation to the conveyor. The knife blade moves continuously.

The prior art systems work well at high feed rates, such as above about 400 crowns per minute, where the cutting means has a cutting velocity corresponding to 400 revolutions per minute of the cutting means.

At lower feed rates, however, such as below about 400 crowns per minute, depending on the extrudate material being severed, the metered quantities of extrudate material are frequently not centered on the crown after being severed by the cutting means, and defective inserts result. That the metered quantities of extrudate material are centered on the crowns when the apparatus is operating at high production rates but are not centered at low production rates seems to indicate that the extrudate material absorbs the shock of the cutting means and elongates rather than being sheared at the cutting velocity of the cutting means for production rates below about 400 crowns per minute. These machines work most effectively only when the production rate is sufficiently high that the cutting means will have the minimum cutting velocity required to cleanly sever the extrudate material without having the extrudate material absorb some of the shock and elongating, thereby affecting, among other things, the trajectory of the extrudate material as it drops downwardly to the crowns.

Each material fed through the extruder has a unique critical deformation rate at which it begins to absorb the shock of the cutting means rather than being cleanly sheared, and this is an additional variable.

SUMMARY OF THE INVENTION

The present invention obviates the disadvantages of the prior art by providing an apparatus including a variable speed conveyor carrying a plurality of constantly moving uniformly spaced receptacles, an extruder means and a cutting means, wherein the cutting means and the conveyor are driven at speeds independent of each other, preferably by separate motor means, and wherein the cutting means is intermittent in operation. The extruder means can be driven by the motor means for the conveyor, the motor means for the cutting means, or by yet another separate motor means.

The cutting means operates at a frequency proportional to the feed rate of crowns and the speed of the conveyor, but has a cutting velocity independent of the feed rate. The apparatus of the present invention will therefore supply a metered quantity of extrudate material to each receptacle at any feed rate, and the cutting velocity of the cutting means will always be sufficient to cleanly shear and sever the extrudate material, thereby, among other things, precisely and uniformly depositing the material in a predetermined position in each successive receptacle. In addition to working effectively at high feed rates, such as over about 400 units per minute, the present invention contemplates an apparatus wherein the cutting means will have a cutting velocity sufficient cleanly to sever the extrudate material even where the feed rate is less than one unit per minute. This has particular importance for products having thick walls, which require a much longer time to cool than thin-walled products.

In the preferred embodiment, the driving means for the cutting means is driven by a stepping motor which is intermittent in operation. The stepping motor can be set to drive the cutting means at the optimal cutting velocity for the extrudate material. An actuating means may be provided whereby the stepping motor is responsive to the presence of a receiving device in a predetermined feed position.

The method of the present invention for providing a metered charge of material to a plurality of continuously moving uniformly spaced receptacles which can travel at varying speeds includes the steps of advancing the receptacles on a conveyor at a predetermined rate and speed and in a predetermined spaced relation along a receiving path, providing material to be cut into metered charges and to be deposited in each of the receptacles at a rate proportional to the speed of the conveyor, cutting the material into metered charges by a cutting means at a frequency proportional to the speed of the conveyor, and intermittently actuating the cutting means at a frequency directly proportional to the rate of supply of receptacles to the conveyor so that the cutting means has a cutting velocity independent of the speed of the conveyor and the frequency of operation of the cutting means.

DESCRIPTION OF THE PREFERRED EMBODIMENTS

Figure 1:
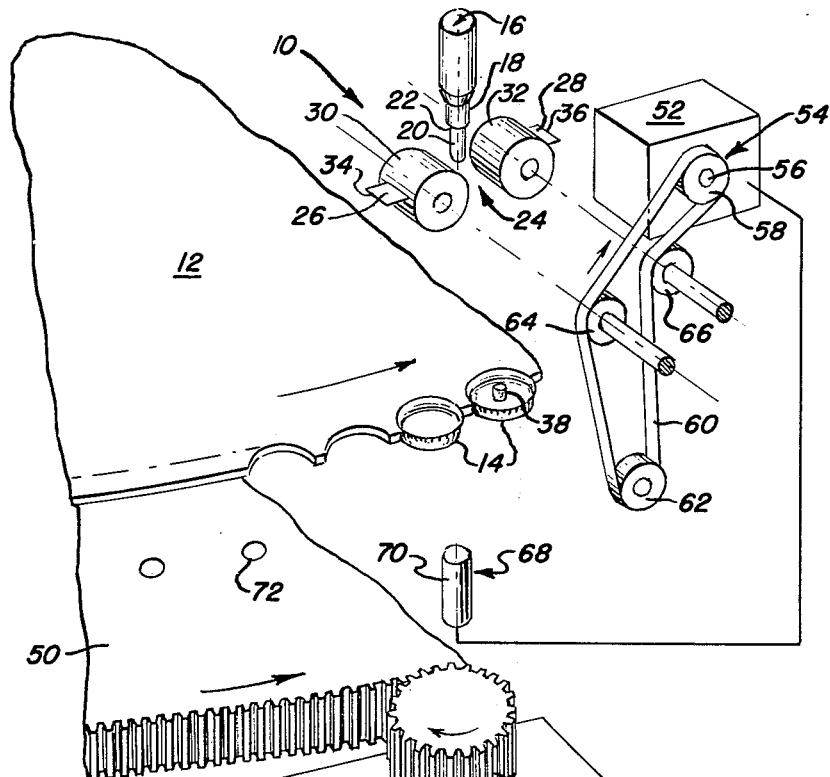
FIG. 1 is a fragmentary perspective view of an apparatus utilizing the principles of the present invention.
Figure 2:
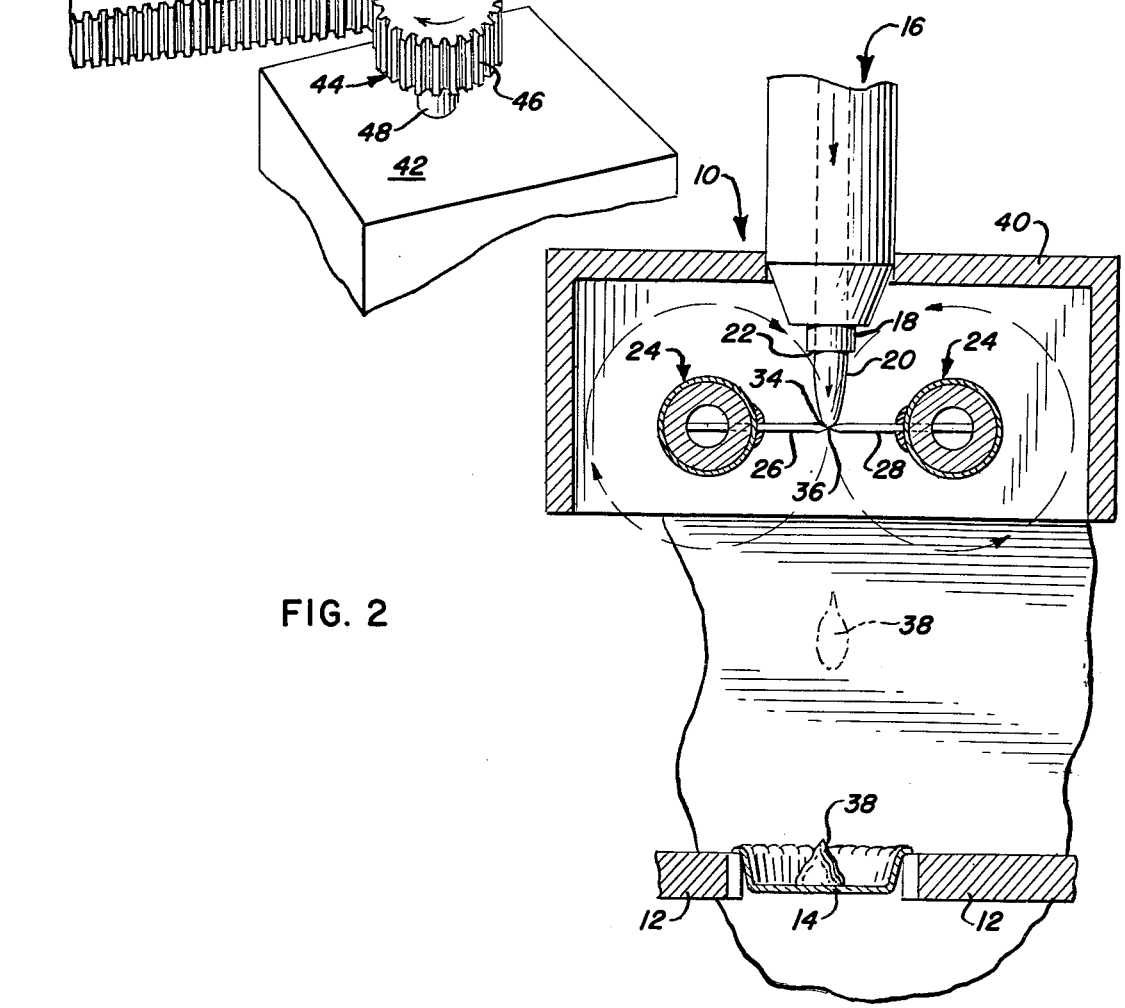
FIG. 2 is a fragmentary elevational view of the apparatus in FIG. 1, taken partly in section.

The apparatus 10 utilizing the principles of the present invention is illustrated in FIGS. 1 and 2 and includes an endless conveyor 12 supported for rotation about a fixed vertical axis (not shown) which supports a plurality of open-topped receptacles or crown caps 14 and moves the receptacles along a receiving path at a predetermined feed rate. Extruder means 16 is a conventional extruder and has a nozzle 18 and is positioned above the receiving path for the receptacles 14 and produces a continuous supply of extrudate material 20 which is preferably directed along a vertical path toward the receiving path defined by conveyor 12. While nozzle 18 is shown vertical, it could be angularly disposed if desirable. Extruder 16 has an outlet 22 for progressively feeding the extrudate material 20 along the extrudate path at a rate proportional to the feed rate, so that the same measured amount of material is supplied for each receptacle.

Cutter means 24 is a cutter having cutter blades 26 and 28 that are supported for rotation on shafts 30 and 32 and are respectively rotated about horizontal axes on opposite sides of extrudate material 20. The cutter blades are driven in synchronous, counter-rotation so that, when they are disposed towards one another in horizontal alignment, the outer edges 34 and 36 of the respective blades substantially meet along a line which passes through the center axis of extruder nozzle 18. Each time the blades meet, extrudate material 20 is severed into a metered charge or slug 38 which is deposited into an open-topped receptacle 14 by the combination of forces imparted to it by the blades and gravity. Cutter 24 may comprise any conventional type of cutter means, such as a punch, or one or more cutting blades. The cutter means operates at a rate proportional to the feed rate of receptacles and the feed rate of extrudate material 20, so that a measured amount of material is supplied to each receptacle.

Apparatus 10 further includes a frame 40. Conveyor 12 is mounted on a lower portion of the frame, and extruder 16 is mounted on the frame generally above conveyor 12. Shafts 30 and 32 are journaled for rotation whereby cutter blades 26 and 28 are positioned below outlet 22 in the extruder 16.

Variable driving means drives a conveyor 12, extruder 16, and cutter 24. The speed of the conveyor, feed rate of the extruder, and frequency of operation of the cutter are all proportional at any rate of production for a particular product, to ensure that a metered charge is supplied to each receptacle. Unlike the apparatuses disclosed in the prior art, however, the cutter in the present invention operates at a cutting velocity which is independent of the feed rate of crowns, so that the cutter, when operated, moves at a cutting velocity which is sufficient to cleanly sever the extrudate material at any feed rate. Thus, the cutter operates with a frequency proportional to the speed of crowns, but travels with a cutting velocity independent of the feed rate of crowns.

As shown in FIG. 1, the apparatus for driving conveyor 10 consists of a first motor means 42, such as an electric motor, with first driving means 44 driven by motor means 42, for driving conveyor 12 at a predetermined rate. First driving means 44 has gear 46 fixed to output shaft 48 from first motor means 42 and engaging gear teeth on enlarged drive gear 50 which is fixedly secured to conveyor 12 by suitable means (not shown). Rotation of gear 46 at a constant rate will drive conveyor 12 at a constant predetermined rate. Since receptacles 14 are equally spaced on conveyor 12, receptacles will be moving at a predetermined rate and in a predetermined spaced relation along a receiving path.

Whereas the cutter in a conventional apparatus is continuously driven and is operably connected to the motor means which drives the conveyor, the apparatus of the present invention includes a second motor means 52 with second driving means 54 driven by motor means 52, for driving cutter 24 at a frequency proportional to the feed rate of crowns. Second driving means 54 includes shaft 56 driven by second motor means 52 at a frequency proportional to the feed rate of crowns. Shaft 56 has drive sprocket wheel 58 secured thereto which drives endless chain belt 60. Cutter driving means 54 includes idler sprocket wheel 62 and drive sprocket wheels 64 and 66 respectively connected to shafts 30 and 32 for rotating cutter blades 26 and 28. Though the cutter is driven by a second motor means in the preferred embodiment of this invention, it is recognized that other arrangements may be suitable wherein the cutter is driven by an intermittently operating second driving means driven by the first motor means.

In the preferred embodiment of this invention, the second motor means 52 is a stepping motor, such as those produced by Superior Electric Company under the name Slo-Syn, which is operatively connected to shafts 30 and 32 and which intermittently drives cutter 24. The stepping motor 52 enables cutter 24 to remain motionless throughout most of the cycle while a receptacle advances into position, and provides cutter 24 with sufficient velocity to cleanly sever a metered charge of extrudate material when a receptacle advances into the receiving position.

It is recognized that where the stepping motor has a frequency of operation corresponding to a sufficiently high feed rate, the stepping motor will in effect be driving the cutting means continuously. Such a rate of production will be the maximum frequency with which the stepping motor can operate to have the cutter sever the quantity of extrudate material for each receptacle at the maximum feed rate of the receptacles.

Extruder 16 has a driving means (not shown) which is preferably driven by a third motor means (not shown) which is variable in speed and which provides a constant quantity of extrudate material for each receptacle 14 for any feed rate of receptacles. Alternatively, the driving means for extruder 16 may be driven by the first motor means 42, or even by the second motor means 52.

Since different products vary in the quantity of extrudate material that is desired in each receptacle, the feed rate of the extruder can be varied to supply the desired quantity of extrudate material for each receptacle. Alternatively, since the extrudate material may be in the form of rods, a rod of particular diameter can be chosen for a particular feed rate. Once the desired quantity for each receptacle is determined, the extruder is preset for this feed rate, and the feed rate is then varied in proportion to any change in the feed rate of receptacles.

An actuating means 68 is also provided to coordinate the timing of the cutting of the extrudate material with the position of the receptacles 14 on the conveyor, to ensure that a metered charge of material is supplied to each receptacle. Actuating means 68 is responsive to the presence of a receptacle at a predetermined position, such as the position where each receptacle receives a slug of material. For example, the actuating means 68 may comprise an electric eye 70 to which second motor means 52 is responsive, with drive gear 50 having apertures 72 corresponding in position to each receptacle 14, whereby second motor means 52 may be actuated each time a receptacle 14 is in position to receive a metered charge of material.

It is a feature of the apparatus of the present invention that different products may be produced on the apparatus. Prior art apparatuses can cleanly sever a metered charge of material only at high production rates, with the cutter severing at least 400 metered charges per minute, depending on the type of extrudate material. By enabling the cutter to travel at a cutting velocity independent of the feed rate of receptacles, a wider range of products can be produced with the apparatus of this invention.

Conventional insert forming apparatuses have a minimum cutting frequency of about 700 parts per minute to effectively make a clean cut when the extrudate material is Klucel manufactured by Hercules, Inc., 400 parts per minute when the extrudate material is a typical vinyl foam, 300 parts per minute when the extrudate material is a typical polyethelene, and are particularly adapted to manufactured products wherein the metered charge forms a thin wall, such as an insert in a crown cap having a thickness of about 0.006 inches. Thin-walled inserts cool quickly and can be manufactured at feed rates exceeding 300 to 400 parts per minute. Where the extrudate material is used to form a thick-walled product, the cooling time increases, and production rates exceeding 300 or 400 parts per minute are not possible. The apparatus of the present invention, however, can be used to manufacture a 36 mm. stopper for intraveneous solution bottles at a rate of 108 parts per minute, with the conveyor operating at 3 revolutions per minute, and having 36 tooling stations equally spaced thereon. Similarly, the present invention could be used to form products even thicker than a 36 mm. stopper, and have as few as one tooling station on the conveyor with the conveyor rotating at a speed of less than one revolution per minute.

Where the cutter includes at least one blade, the cutter is provided with a null position in which the edges of the knife blades are spaced away from the outlet of the extruder and the path of the extrudate. The apparatus will thereby have a clean start-up and shut-down.

While this invention is susceptible of embodiment in many different forms, there is shown in the drawings and described herein in detail, a preferred embodiment of the invention, with the understanding that the present disclosure is to be considered as an exemplification of the principles of the present invention and not intended to limit the invention to the embodiment illustrated.

What is claimed is:

1. An apparatus for providing a metered charge of material to a plurality of continuously moving uniformly spaced receptacles which can travel at varying speeds, comprising
    a conveyor for advancing said receptacles at predetermined rates and speeds and in a predetermined spaced relation along a receiving path,
    means for providing material to be cut into metered charges and to be deposited in each of said receptacles at a rate proportional to the speed of said conveyor,
    cutting means for severing said material into metered charges at a frequency proportional to the speed of the conveyor, and
    means for driving the conveyor at variable rates to position said receptacles at a receiving station at a rate proportional to the rate of supply of the receptacles to the conveyor, for driving said material providing means at a rate directly proportional to the rate of supply of receptacles to said conveyor, and for intermittently driving said cutting means at a frequency directly proportional to the rate of supply of receptacles to said conveyor and at a cutting velocity to sever said material for any speed of said conveyor and frequency of operation of said cutting means, said cutting velocity being preselected and independent of the speed of said conveyor and of the frequency of operation of said cutting means.

2. An apparatus as defined in claim 1 wherein said material providing means is an extruder means.

3. An apparatus as defined in claim 1 wherein said last named means comprises
    conveyor driving means,
    material providing driving means, and
    cutter driving means; and
    first motor means for driving said conveyor driving means; and
    second motor means for driving said cutter driving means.

4. An apparatus as defined in claim 3 wherein said second motor means is a stepping motor which is intermittent in operation.

5. An apparatus as defined in claim 3 wherein said second motor means is actuated by an actuating means which is responsive to the presence of one said receptacle in a predetermined feed position.

6. An apparatus as defined in claim 3 wherein said material providing driving means is driven by said first motor means.

7. An apparatus as defined in claim 3 wherein said material providing driving means is driven by said second motor means.

8. An apparatus as defined in claim 3 wherein third motor means is provided for driving said material providing driving means.

9. In an apparatus providing a metered charge of material to a plurality of continuously moving uniformly spaced crown caps which can travel at varying speeds,
    a rotating conveyor advancing said caps at a predetermined rate and speed and in a predetermined spaced relation along a receiving path,
    extruder means for providing material to be cut into metered charges and to be deposited in each of said caps at a rate proportional to the speed of said conveyor,
    cutting means for severing said material into metered charges at a frequency proportional to the speed of the conveyor, and
    means for driving the conveyor at variable rates to position said caps at a receiving station at a rate proportional to the rate of supply of the caps to the conveyor, for driving said extruder means at a rate directly proportional to the rate of supply of caps to said conveyor, and for intermittently driving said cutting means at a frequency directly proportional to the rate of supply of caps to said conveyor and at a cutting velocity to sever said material for any speed of said conveyor and frequency of operation of said cutting means, said cutting velocity being preselected and independent of the speed of said conveyor and of the frequency of operation of said cutting means.

10. In an apparatus as defined in claim 9, including a first driving means for driving said conveyor,
second driving means for driving said cutting means,
third driving means for driving said extruder means,
first motor means for driving said first driving means, and
second motor means for driving said second driving means.

11. In an apparatus as defined in claim 10, in which said second motor means is a stepping motor which is intermittent in operation.

12. A method of providing a metered charge of material to a plurality of continuously moving uniformly spaced receptacles which can travel at varying speeds, which comprises:
advancing said receptacles on a conveyor at a predetermined rate and speed and in a predetermined spaced relation along a receiving path,
providing material to be cut into metered charges and to be deposited in each of said receptacles at a rate proportional to the speed of the conveyor,
cutting said material into metered charges by a cutting means at a frequency proportional to the speed of the conveyor, and
intermittently actuating said cutting means at a frequency directly proportional to the rate of supply of receptacles to said conveyor so that said cutting means has a cutting velocity independent of the speed of said conveyor and of the frequency of operation of said cutting means.

* * * * *